July 9, 1946.  E. T. GILLIARD  2,403,594
CLUTCH MECHANISM FOR VARIABLE SPEED GEARING
Filed July 4, 1945  3 Sheets-Sheet 1
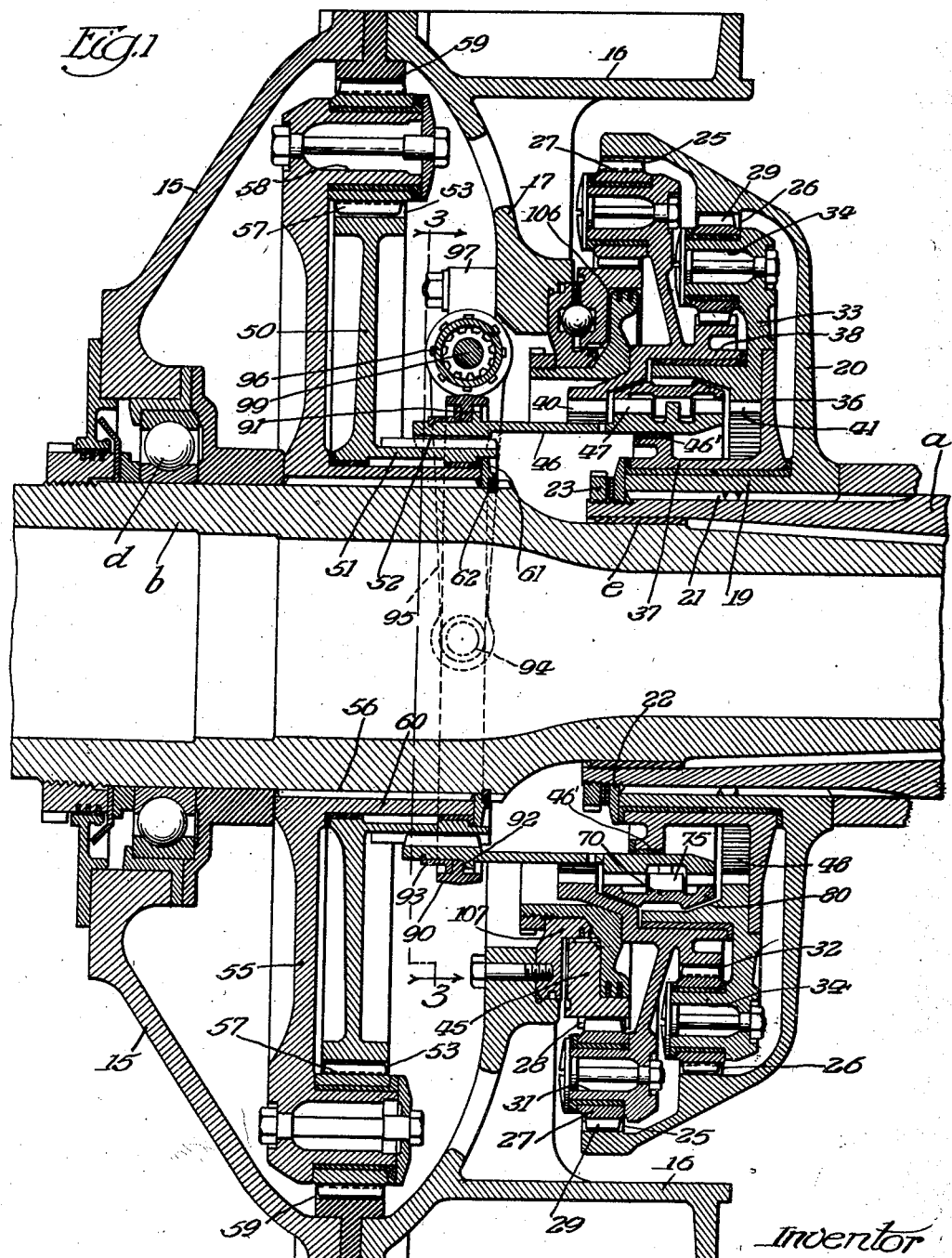
Inventor
Ernest T. Gilliard

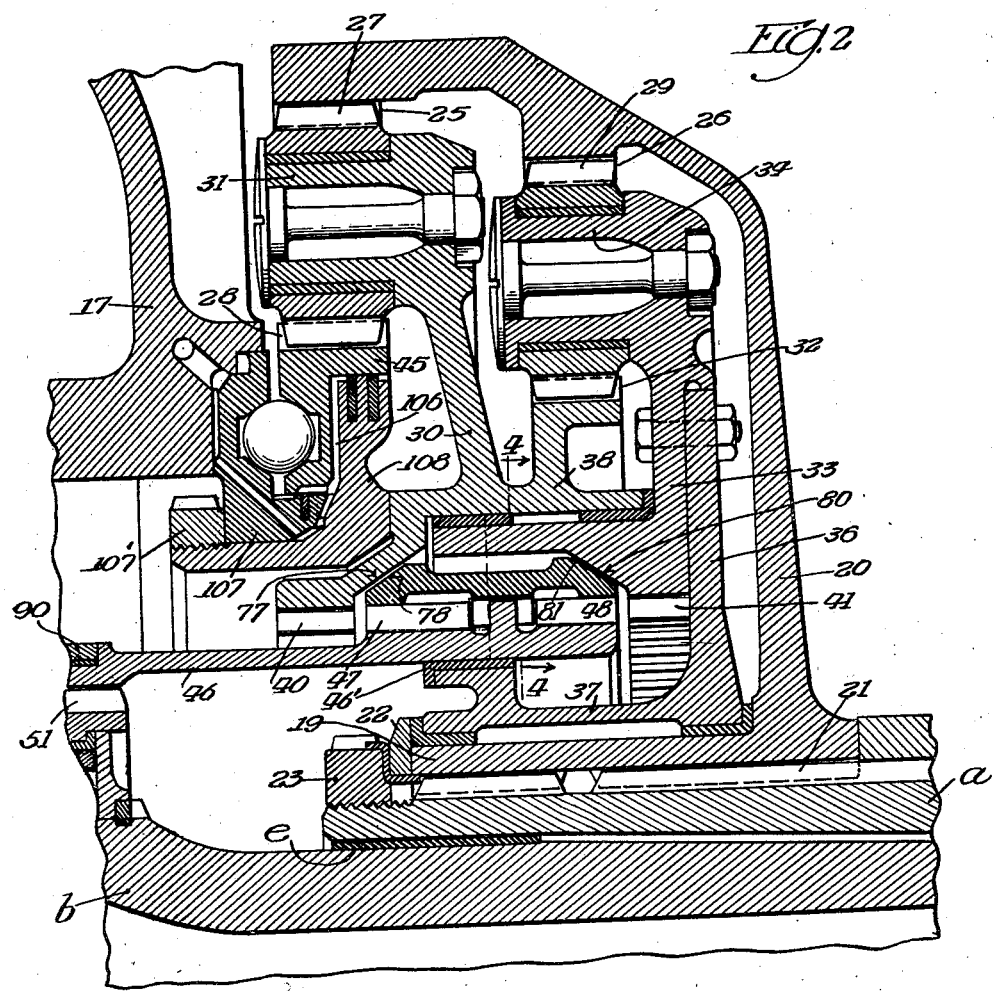
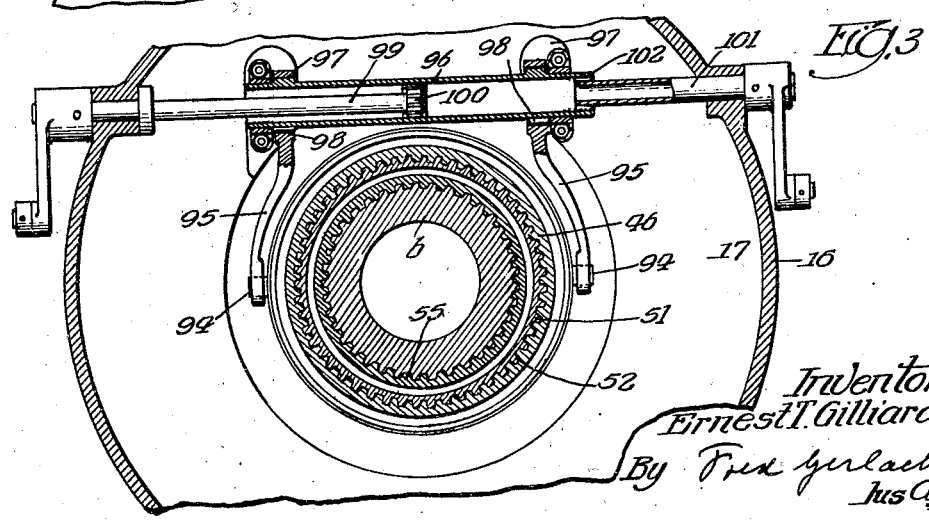

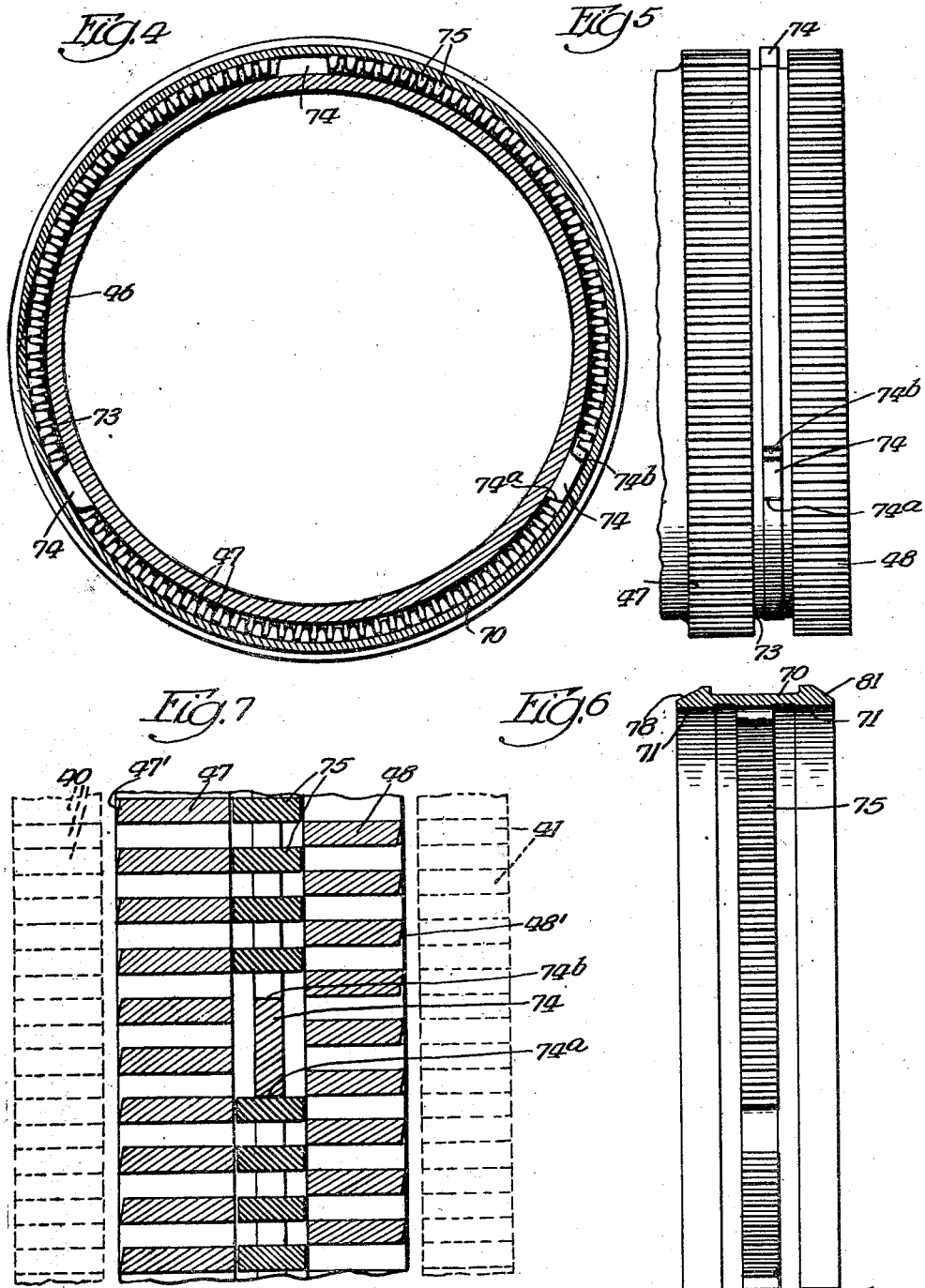

Patented July 9, 1946

2,403,594

UNITED STATES PATENT OFFICE 2,403,594

CLUTCH MECHANISM FOR VARIABLE-SPEED GEARING

Ernest T. Gilliard, Trout Run, Pa., assignor to The Aviation Corporation, New York, N. Y., a corporation of Delaware Application July 4, 1945, Serial No. 603,161

10 Claims. (Cl. 192—53)

The invention relates to clutches for engagement with two-speed driving mechanism.

One object of the invention is to provide clutching mechanism with axially engageable teeth for two-speed driving mechanism with an improved balk-device for controlling meshing of the clutch-teeth until synchronization occurs between the driven and driving elements.

Another object of the invention is to provide clutch mechanism with a balk-ring for controlling the meshing of axially movable clutch-teeth, which is light and compact in construction.

Another object of the invention is to provide clutch mechanism with a relatively large number of clutch-teeth and an improved balk-device which prevents meshing of the clutch-teeth until the speed of the driving and driven elements are rotated at substantially equal speeds, and which is adapted for driving an airplane propeller.

Another object of the invention is to provide clutch mechanism with a balk-ring which is simple in construction and can be economically produced by shaping and milling operations.

Another object of the invention is to provide a rugged trouble free balk-device which is especially designed to withstand the rigors of aircraft use.

Other objects of the invention will appear from the detailed description.

The invention consists in the several features hereinafter set forth and more particularly defined by claims at the conclusion hereof.

In the drawings:

Fig. 1 is a longitudinal section of driving mechanism for a propeller shaft embodying the invention.

Fig. 2 is a section of the two-speed reduction gearing and a portion of the clutch mechanism upon a larger scale.

Fig. 3 is a transverse section taken on line 3—3 of Fig. 1.

Fig. 4 is a transverse section through the balk-ring and clutch-sleeve taken on line 4—4 of Fig. 2.

Fig. 5 is a side elevation of the rear portion of the clutch-sleeve.

Fig. 6 is a longitudinal section of the balk-ring.

Fig. 7 is a diagrammatic view illustrating the clutch-teeth on the clutch-sleeve and the teeth on the balk-ring.

The invention is exemplified in driving mechanism which comprises generally, planetary reduction gearing which is driven by power from the crank-shaft $a$ of an internal combustion engine; clutch-mechanism which is driven by the two-speed reduction gearing; and transmission gearing driven by the clutch mechanism for driving a propeller-shaft $b$. The driving mechanism is enclosed in a gear-case which is usually secured to and supported from the engine case- ing and comprises a front-section 15 and a rear-section 16 and may be of any suitable construction. The transmission gearing is housed in the case-sections 15 and 16. These sections of the gear-case are detachably secured together by bolts.

Propeller-shaft $b$ for an airplane is journalled in an anti-friction bearing $d$ which is supported in the case-section 15 and in a bushing $e$ confined in a socket in the front end of the crank-shaft $a$.

The invention is exemplified with two-speed reduction gearing for driving a propeller-shaft $b$ from the crank-shaft $a$ of an internal combustion engine. This two-speed gearing comprises: a wheel 20 which is provided with a hub 19 on the front end of crank-shaft $a$ and secured to rotate with said shaft by splines 21; a collar 22 and a nut 23 for securing wheel 20 against axial movement on the front end of crank-shaft $a$; an internally toothed gear 25 integral with wheel 20; an internally toothed gear 26 integral with wheel 20 and of lesser pitch diameter than the gear 25; an annular series of planetary pinions 27 meshing with gear 25; a sun-gear 28 meshing with planetary pinions 27 and which is secured against rotation; an annular series of planetary pinions 29 meshing with gear 26; a carrier-wheel 30 which is provided with integral studs 31 on which planetary pinions 27 are journalled for rotation on their own axes; a sun-gear 32 of lesser pitch diameter than the sun-gear 28, integral with carrier 30 and meshing with the planetary pinions 29; a carrier 33 provided with forwardly projecting integral studs 34 on which planetary pinions 29 are journalled for rotation on their own axes and which includes a body-section 36 and a hub 37 which is journalled and axially confined on the forwardly extending hub 19 of wheel 20 for rotation of carrier 33 relatively to wheel 20; a hub 38 on carrier 30 which is journalled on the hub of carrier 33 for relative rotation of carrier 30. Section 36 of carrier 33 is rotatably confined against axial movement on hub 19 of wheel 20 by collar 22 and nut 23. Hub 38 of carrier 30 is rotatably confined against axial movement on the hub of carrier 33 by a cylinder casing 107 for a ring-piston 45 on which sun-gear 28 is formed.

A torque-meter comprises a casing 107 for cylinder 106 and secured to a cross-wall 17 in the gear-case, and a ring-piston 45 in said cylinder, and on sun-gear 28, and holds gear 28 against rotation, for the operation of the two-speed reduction gearing.

A rotatable and axially slidable clutch-sleeve 46 is engageable with the carrier 30 for driving the propeller at the low-speed ratio and with carrier 33 for driving it at the high-speed ratio. An internal peripheral portion of the hub 38 of carrier 30 is provided with an integral annular series of clutch-teeth 40 which are engageable with mating clutch-teeth 47 on sleeve 46, for driving the sleeve and propeller at the low-speed ratio. An internal peripheral portion of the hub 37 of carrier 33 is provided with an annular series of clutch-teeth 41 which are engageable by a mating series of clutch-teeth 48 on clutch-sleeve 46 for driving the sleeve and propeller at the high-speed ratio. The inner end of clutch-sleeve 46 is slidably supported and journalled for relative rotation, as at 46', on the hub 37 of section 36 of carrier 33. When clutch-teeth 47 on sleeve 46 are engaged by axial sliding movement of the sleeve with clutch-teeth 40 on carrier 30, said sleeve will be driven by the two-speed reduction gearing at the low-speed ratio. When sleeve 46 is shifted axially to engage its clutch-teeth 48 with clutch-teeth 41 on carrier 33, said sleeve will be driven by the two-speed reduction gearing at the high speed ratio. When the clutch-sleeve 46 is axially positioned with its teeth 47 and 48 between clutch-teeth 40 and 41, said sleeve will be in its neutral position and uncoupled from the two-speed reduction gearing.

Clutch-sleeve 46 may be connected to drive the propeller in any suitable manner. An exemplification of gearing for driving the propeller-shaft *b* from clutch-sleeve 46 is illustrated in Fig. 1 of the drawings, in which the clutch-sleeve is slidably splined, as at 52, to the hub 51 of wheel 50 which is provided with an externally toothed gear 53; a wheel 55 which is splined, as at 56, to propeller-shaft *b*; planetary pinions 57 which are journalled on studs 58 integral with wheel 55 and mesh with gear 53 and an internally toothed gear 59 which meshes with the planetary pinions 57 and is fixedly secured between sections 15 and 16 of the gear-case. The hub 51 of wheel 50 is journalled on the hub 60 of wheel 55 and held against axial movement thereon by a collar 61 and a split-ring 62. Rotation of wheel 50 by clutch-sleeve 46 imparts, in co-action with the stationary internally toothed gear 59, planetary movement of the pinions 57 and rotates wheel 55 and propeller-shaft *b* from the clutch-sleeve 46 which is driven through the two-speed reduction gearing.

The operation of the two-speed reduction gearing will be as follows: When sleeve 46 is shifted axially and forwardly to mesh its clutch-teeth 47 with the clutch-teeth 40 on the low speed carrier 30 and the sun-gear 28 is secured against rotation, the primary drive-wheel 20 will impart planetary movement to the pinions 27; the planetary movement of the pinions 27 will rotate the carrier 30 and drive the clutch-sleeve 46 through meshing teeth 40 on said carrier and the clutch-teeth 47 on clutch-sleeve 46 at a reduced speed relatively to the crank-shaft *a*. The sun-gear 32 and gear 26 will then impart idle planetary movement to the pinions 29 and the carrier 30 will idle around the clutch-sleeve. When the clutch-sleeve 46 has been axially shifted rearwardly to mesh its clutch-teeth 48 with the clutch-teeth 41 on the high-speed carrier 33, planetary movement will be imparted to the pinions 27 by the sun-gear 28 and internal gear 25 on the wheel 20; the carrier 30 will rotate the sun-gear 32 relatively to carrier 33 and impart planetary movement to the pinions 29 so that the carrier 33 will be driven in the same direction as the carrier 30 and at the high-speed ratio and at a reduced speed relatively to the crank-shaft *a*.

The invention comprises a balk-ring 70 which extends around the clutch-teeth 40 and 41 and is provided with internal peripheral portions 71 which are slidable axially on said clutch-teeth. The inner ends of clutch-teeth 47 and 48 on clutch-sleeve 46 are spaced apart to form an annular channel 73. Abutments 74, integral with sleeve 46, are circumferentially arranged at the longitudinal center of the channel 73 or the space between the clutch-teeth 47 and 48. Clutch-teeth 47 and 48 are staggered circumferentially. The inner periphery of the hub 38 of carrier 30 is provided with a conoidal peripheral friction-face 77 and the balk-ring 70 is provided with a mating friction-face 78 for frictionally driving, when engaged, the balk-ring from carrier 30. Hub 37 of high speed carrier 33 is provided with a conoidal friction-face 80 and a mating friction-face 81 is formed on the rear end of the balk-ring for frictionally driving, when engaged, the balk-ring from the high speed carrier. A series of teeth 75 are provided on the longitudinally central portion of the inner periphery of balk-ring 70 and extend axially and fit between the inner ends of clutch-teeth 47 and 48, when sleeve 46 is in its neutral position. Teeth 75 at one of their ends are adapted to be engaged by the inner ends of clutch-teeth 48 when teeth 75 and 48 are in longitudinal alignment to limit the forward axial movement of sleeve 46 until teeth 48 and 75 are relatively rotated to align teeth 75 with the spaces between teeth 48 to release sleeve 46 for continued forward movement of clutch-sleeve 46. Teeth 75 at their opposite ends are adapted to be engaged by teeth 47 on sleeve 46 when said teeth are longitudinally aligned for limiting rearward movement of sleeve 46 and releasing said sleeve for further rearward movement when teeth 75 and 47 are relatively rotated to longitudinally align teeth 75 with the spaces between the teeth 47. Abutments 74 project outwardly from the outer periphery of sleeve 46 in the central portion of the channel 73 and some of the teeth 75 are omitted from circumferential portions of the balk-ring to permit limited relative rotation between the balk-ring and clutch-sleeve.

Mechanism for axially shifting the clutch-sleeve 46 for controlling the speed ratio at which the propeller-shaft *b* is driven is exemplified by an axially movable shifter-collar 90 which is provided with an inwardly extending flange 91 which is confined between an annular shoulder 92 and a collar 93 on sleeve 46, while the latter is rotating; diametrically opposite pivot-studs 94 formed on collar 90; arms 95 having their distal ends pivotally connected to studs 94; a tubular shaft 96 journalled in brackets 97 which are fixed to cross-wall 17 in gear-case section 16 and to which arms 95 are splined, as at 98; and a torque-rod 99 extending through tubular shaft 96 and splined thereto at 100. Torque-rod 99 may be connected in any suitable manner for remote control, usually by a hydraulic piston and cylinder which is adapted to provide torque for rocking arms 95 to shift clutch-sleeve 46 between its neutral and its high-speed and low-speed driving positions. A shaft 101 is splined, as at 102, to tubular shaft 96 for operating an indicator for the position of the clutch mechanism.

The operation of the mechanism for selectively driving clutch-sleeve 46 and the propellers at different speed ratios will be as follows: assuming the clutch-teeth 47 on sleeve 46 to be meshed with clutch-teeth 40 on the low-speed carrier 30 and the propellers are being driven at the low-speed ratio and it is desired to drive the propellers at the high-speed ratio, the pilot will close the engine throttle to reduce the torque to substantially zero on the two-speed gearing and slide clutch-sleeve 46 rearwardly to disengage said clutch-teeth 47. Rearward force applied to the clutch-sleeve, will move clutch-teeth 47 longitudinally in alignment with teeth 75 on the balk-ring and the engagement of the inner ends of clutch-teeth 47 with the front ends of teeth 75 arrests sleeve 46 against further rearward movement. The friction-face 80 on the balk-ring will engage the balk-ring friction-face 81 on the high-speed carrier 33 which will rotatively urge teeth 75 on the balk-ring which are engageable with abutments 74 to maintain teeth 75 in engagement with the ends 74ª of said abutments and continue to restrain the clutch-sleeve against rearward movement. The pilot will then slow down the engine or speed the propeller rotation by change of blade angle. When the speed of the carrier 33 and clutch-sleeve 46 come to synchronization, the tendency of the engine to continue to slow down causes the high-speed carrier 33 to frictionally rotate the balk ring around clutch-sleeve 46 until teeth 75 are longitudinally aligned with the spaces between clutch-teeth 47, at which time teeth 75 will be disposed substantially at the ends 74ᵇ of abutments 74. The clutch-sleeve 46 will then be released for continued rearward movement, the clutch-teeth 47 passing between the teeth 75 on the balk ring and clutch-teeth 48 will mesh with clutch-teeth 41 on the high-speed carrier. The clutch-sleeve 46 will then be positively driven at the high-speed ratio from the carrier 33. The rear ends of clutch-teeth 48 are chamfered, as at 48', to facilitate the passage of teeth 48 on sleeve 46 between the teeth 41 on carrier 33.

When the propellers are being driven at the high-speed ratio and it is desired to drive them at the low-speed ratio, the pilot will close the engine throttle to reduce the torque to substantially zero on the two-speed gearing and apply forward force to move the clutch-sleeve 46 to slide clutch-teeth 48 out of engagement with clutch-teeth 41 on the carrier 33. The inner ends of clutch-teeth 48 will then be longitudinally aligned with the rear ends of the teeth 75 on the balk-ring and the engagement of the inner ends of clutch-teeth 48 with the rear ends of teeth 75 will arrest the sleeve against further forward movement. The friction-face 78 on the balk-ring will engage the friction-face 77 on the low-speed carrier 30. The teeth 75 on the balk-ring 70 which are engageable with abutments 74 will then be disposed substantially at the ends 74ᵇ of said abutments and maintain the contiguous ends of teeth 75 longitudinally aligned with the inner ends of clutch-teeth 48 and maintain the balk-ring in position to restrain further forward movement of the clutch-sleeve 46. The pilot will then increase the speed of the engine or slow down the propeller speed until the speed of the clutch-sleeve and the low-speed carrier has been synchronized. As soon as the relative speed between the engine and propeller is sufficient to rotate the balk-ring around clutch-sleeve 46 the teeth 75 on the balk-ring will be rotatively urged into longitudinal alignment with the spaces between clutch-teeth 48 and said sleeve will be released for forward movement. The continued forward force applied to the clutch-sleeve will shift it to mesh its clutch-teeth 47 with teeth 40 on the low-speed carrier 30, the clutch-teeth 48 passing longitudinally between teeth 75 on the balk-ring. The front ends of teeth 47 are chamfered, as at 47', to facilitate the passage of clutch-teeth 47 between clutch-teeth 40. Clutch-sleeve 46 will then be positively driven from the low-speed carrier 30.

The invention exemplifies clutch mechanism for driving an airplane propeller at different speed ratios from the engine, which includes clutch-teeth which are adapted to be meshed by axial relative sliding movement and a balk device which is simple in construction and efficient in operation for preventing meshing of the clutch-teeth until the driving and driven elements are substantially synchronized. The invention also exemplifies a clutch mechanism with a balk device for driving the clutch-teeth at different speed ratios which comprises teeth on the balk-ring which co-act with the clutch-teeth on the clutch-sleeve for controlling the sliding engagement of the clutch-teeth on the clutch-sleeve with the teeth on the driving elements. The balk device is substantially symmetrical, allows the use of large concentric shafts with the two-speed gear reduction assembly, and can be economically fabricated by shaping and milling operations.

The invention is not to be understood as limited to the details described, since these may be modified within the scope of the appended claims without departing from the spirit and scope of the invention.

Having thus described the invention, what I claim as new and desire to secure by Letters Patent is:

1. Clutch mechanism for variable speed driving comprising, a pair of wheels, each provided with an annular series of clutch-teeth, a clutch-sleeve axially slidable relatively to the wheels and provided with a pair of annular series of external clutch-teeth, spaced apart longitudinally, for slidable meshing with the teeth on the wheels, respectively, a balk-ring extending circumferentially around the clutch-teeth on the sleeve, and relatively to which the sleeve is rotatable and slidable, provided with a circumferential series of internal teeth adapted to alternately mesh with, and to pass axially between the teeth of, the pair of series of clutch-teeth on the sleeve, upon relative axial movement of the balk-ring and the sleeve, abutments on the outer periphery of the clutch-sleeve axially disposed between the series of clutch-teeth on the sleeve engageable with and circumferentially spaced between some of the teeth on the balk-ring for limited relative rotation when the teeth on the balk-ring are positioned axially between the series of clutch-teeth on the sleeve, and friction-means between the balk-ring and the wheels, respectively, for producing relative rotation of the balk-ring and clutch-sleeve to alternately move the teeth on the balk-ring into axially abutting relation with one series, and into axially aligned relation with the spaces between the teeth of the other series, of the clutch-teeth on the sleeve and controlling relative axial sliding movement for meshing the clutch-teeth on the sleeve and the wheels.

2. Clutch mechanism for variable speed driving comprising, a pair of wheels, each provided with an annular series of clutch-teeth, a clutch-sleeve axially slidable relatively to the wheels and provided with a pair of annular series of external clutch-teeth, spaced apart longitudinally, for slidable meshing with the teeth on the wheels, respectively, the teeth on one series of clutch-teeth on the sleeve being circumferentially offset relatively to the other, a balk ring extending circumferentially around the clutch-teeth on the sleeve, and relatively to which the sleeve is rotatable and slidable, provided with a circumferential series of internal teeth adapted to alternately mesh with, and to pass axially between the teeth of, the pair of series of clutch-teeth on the sleeve, upon relative axial movement of the balk-ring and the sleeve, abutments on the outer periphery of the clutch-sleeve axially disposed between the series of clutch-teeth on the sleeve engageable with and circumferentially spaced between some of the teeth on the balk-ring for limited relative rotation when the teeth on the balk-ring are positioned axially between the series of clutch-teeth on the sleeve, and friction-means between the balk-ring and the wheels, respectively, for producing relative rotation of the balk-ring and clutch-sleeve to alternately move the teeth on the balk-ring into axially abutting relation with one series, and into axially aligned relation with the spaces between the teeth of the other series, of the clutch-teeth on the sleeve and controlling relative axial sliding movement for meshing the clutch-teeth on the sleeve and the wheels.

3. Clutch mechanism for variable speed driving comprising, a pair of wheels, each provided with an annular series of internal clutch-teeth, a clutch-sleeve axially slidable relatively to the wheels and provided with a pair of annular series of external clutch-teeth, spaced apart longitudinally, for slidable meshing with the teeth on the wheels, respectively, a balk-ring extending circumferentially around the clutch-teeth on the sleeve and relatively to which the sleeve is rotatable and slidable, provided with a circumferential series of internal teeth adapted to alternately mesh with, and to pass axially between the teeth of, the pair of clutch-teeth on the sleeve, upon relative axial movement of the balk-ring and the sleeve, abutments on the outer periphery of the clutch-sleeve axially disposed between the series of clutch-teeth on the sleeve, engageable with and circumferentially spaced between some of the teeth on the balk-ring for limited relative rotation when the teeth on the balk-ring are positioned axially between the series of clutch-teeth on the sleeve, and friction-means between the balk-ring and the wheels, respectively, for producing relative rotation of the balk-ring and clutch-sleeve to alternately move the teeth on the balk-ring into axially abutting relation with one series, and into axially aligned relation with the spaces between the teeth of the other series, of the clutch-teeth on the sleeve and controlling the relative axial movement for slidably meshing the clutch-teeth on the sleeve and the wheels.

4. Clutch mechanism for variable speed driving comprising, a pair of wheels, each provided with an annular series of internal clutch-teeth, a clutch-sleeve axially slidable relatively to the wheels and provided with a pair of annular series of external clutch-teeth, and a channel axially disposed between them for slidable meshing with the teeth on the wheels, respectively, a balk-ring extending circumferentially around the clutch-teeth on the sleeve, and to which the sleeve is relatively rotatable and slidable, provided with a circumferential series of internal teeth adapted to alternately mesh with, and to pass axially into the channel in the sleeve, upon relative axial movement of the balk-ring and the sleeve, abutments on the outer periphery of the clutch-sleeve disposed in said channel engageable with and circumferentially spaced between some of the teeth on the balk-ring for limited relative rotation when the teeth on the balk-ring are positioned axially between the series of clutch-teeth on the sleeve, and friction-means between the balk-ring and the wheels, respectively, for producing relative rotation of the balk-ring and clutch-sleeve to alternately move the teeth on the balk-ring into axially abutting relation with one series, and into axially aligned relation with the spaces between the teeth of the other series, of the clutch-teeth on the sleeve and controlling relative axial sliding movement for meshing the clutch-teeth on the sleeve and the wheels.

5. Clutch mechanism for variable speed driving comprising, a pair of wheels, each provided with an annular series of internal clutch-teeth, a clutch-sleeve axially slidable relatively to the wheels and provided with a pair of annular series of external clutch-teeth, spaced apart longitudinally, for slidable meshing with the teeth on the wheels, respectively, a balk-ring extending circumferentially around the clutch-teeth on the sleeve and relatively to which the sleeve is rotatable and slidable, provided with a circumferential series of internal teeth adapted to alternately mesh with, and to pass axially between the teeth of, the pair of series of clutch-teeth on the sleeve, upon relative axial movement of the balk-ring and the sleeve, abutments on the outer periphery of the clutch-sleeve axially disposed between the series of clutch-teeth on the sleeve, engageable with and circumferentially spaced between some of the teeth on the balk-ring for limited relative rotation when the teeth on the balk-ring are positioned axially between the series of clutch-teeth on the sleeve, and friction-means between the ends of the clutch-ring and the wheels, respectively, for producing relative rotation of the balk-ring and clutch-sleeve to alternately move the teeth on the balk-ring into axially abutting relation with one series, and into axially aligned relation with the spaces between the teeth of the other series, of the clutch-teeth on the sleeve and controlling relative axial sliding movement for meshing the clutch-teeth on the sleeve and the wheels.

6. Clutch mechanism for variable speed driving comprising, a pair of wheels, each provided with an annular series of internal clutch-teeth, a clutch-sleeve axially slidable relatively to the wheels and provided with a pair of annular series of external clutch-teeth, spaced apart longitudinally, for slidable meshing with the teeth on the wheels, respectively, a balk-ring extending circumferentially around the clutch-teeth on the sleeve, and relatively to which the sleeve is rotatable and slidable, provided with an integral circumferential series of internal teeth adapted to alternately mesh with, and to pass axially between the teeth of the pair of series of clutch-teeth on the sleeve, upon relative axial movement of the balk-ring and the sleeve, abutments on the outer periphery of and integral with the clutch-sleeve, axially disposed between the series of clutch-teeth on the sleeve, engageable with and circumferentially spaced between some of the teeth on the balk-ring for limited relative rotation when the teeth on the balk-ring are positioned axially between the series of clutch-teeth on the sleeve, and friction-means between the balk-ring and the wheels, respectively, for producing relative rotation of the balk-ring and clutch-sleeve to alternately move the teeth on the balk-ring into axially abutting relation with one series, and into axially aligned relation with the spaces between the teeth of the other series, of the clutch-teeth on the sleeve and controlling relative axial sliding movement for meshing the clutch-teeth on the sleeve and the wheels.

7. Clutch mechanism for variable speed driving comprising, a pair of wheels, each provided with an annular series of clutch-teeth, a clutch-sleeve axially slidable relatively to the wheels and provided with a pair of annular series of external clutch-teeth, spaced apart longitudinally, for slidable meshing with the teeth on the wheels, respectively, a balk-ring extending circumferentially around the clutch-teeth on the sleeve, and relatively to which the sleeve is relatively rotatable and slidable, provided with an integral circumferential series of internal teeth adapted to alternately mesh with, and to pass axially between the teeth of the pair of series of clutch-teeth on the sleeve, upon relative axial movement of the balk-ring and the sleeve, abutments on the outer periphery of and integral with the clutch-sleeve, axially disposed between the series of clutch-teeth on the sleeve, engageable with and circumferentially spaced between some of the teeth on the balk-ring for limited relative rotation when the teeth on the balk-ring are positioned axially between the series of clutch-teeth on the sleeve, friction-faces on the wheels, respectively, and co-acting friction-faces on the ends of the balk-ring for producing relative rotation of the balk-ring and clutch-sleeve to alternately move the teeth on the balk-ring into axially abutting relation with one series, and into axially aligned relation with the spaces between the teeth of the other series, of clutch-teeth on the sleeve and controlling the relative axial movement for slidably meshing the clutch-teeth on the sleeve and the wheels.

8. Clutch mechanism comprising, a pair of coaxial drive wheels for driving at different speed ratios, each provided with an annular series of internal clutch-teeth, a clutch-sleeve axially slidable between and adapted to be driven by said wheels and provided with a pair of annular series of external clutch-teeth spaced apart longitudinally, for slidable meshing with the teeth on the wheels, respectively, a balk-ring extending circumferentially around and rotatable on the clutch-teeth on the sleeve and through which the sleeve is slidable, provided with a circumferential series of internal teeth adapted to alternately mesh with and to pass axially between the teeth of the pair of series of clutch-teeth on the sleeve upon relative axial movement of the balk-ring and the sleeve, with arcuate spaces between some of said teeth in the balk-ring, abutments on the outer periphery of the clutch-sleeve axially disposed between the series of clutch-teeth on the sleeve and extending into said arcuate spaces for limited relative rotation when the teeth on the balk-ring are positioned axially between the series of clutch-teeth on the sleeve, conoidal friction-faces on the ends of the balk-ring and mating friction faces on the wheels, for producing relative rotation of the balk-ring and clutch-sleeve to alternately move the teeth on the balk-ring into axial abutting relation with one series, and into axial aligned relation with the spaces between the teeth on the other series, of the clutch-teeth on the sleeve and controlling relative axial sliding movement of the sleeve for meshing its clutch-teeth and the clutch-teeth on the wheels.

9. Clutch mechanism comprising, a pair of coaxial drive-wheels for driving at different speed ratios, each provided with an annular series of internal clutch-teeth, a clutch-sleeve axially slidable between and adapted to be driven by said wheels and provided with a pair of integral annular series of external clutch-teeth spaced apart longitudinally, for slidable meshing with the teeth on the wheels, respectively, a balk-ring extending circumferentially around and rotatable on the clutch-teeth on the sleeve and through which the sleeve is slidable, integrally provided with a circumferential series of internal teeth adapted to alternately mesh with and to pass axially between the teeth of the pair of series of clutch-teeth on the sleeve upon relative axial movement of the balk-ring and the sleeve with arcuate spaces between some of said teeth on the balk-ring, abutments integral with the outer periphery of the clutch-sleeve axially disposed between the series of clutch-teeth on the sleeve and extending into said arcuate spaces, for limited relative rotation when the teeth on the balk-ring are positioned axially between the series of clutch-teeth on the sleeve, conoidal friction-faces on the ends of the balk-ring and mating friction-faces on the wheels, for producing relative rotation of the balk-ring and clutch-sleeve to alternately move the teeth on the balk-ring into axial abutting relation with one series, and into axial aligned relation with the spaces between the teeth on the other series, of the clutch-teeth on the sleeve and controlling relative axial sliding movement of the sleeve for meshing the clutch-teeth on the sleeve and on the wheels.

10. Clutch mechanism comprising, a pair of coaxial drive-wheels for driving at different speed ratios, each provided with an annular series of internal clutch-teeth, an axially slidable clutch-sleeve between and adapted to be driven by said wheels and integrally provided with a pair of annular series of external clutch-teeth, spaced apart longitudinally, for slidable meshing with the teeth on the wheels, respectively, the teeth of one series of clutch-teeth on the sleeve being circumferentially offset relatively to the other, a balk-ring extending circumferentially around and rotatable on the clutch-teeth on the sleeve and relatively to which the sleeve is rotatable and slidable, integrally provided with a circumferential series of internal teeth adapted to alternately mesh with and to pass axially between the teeth of the pair of series of clutch-teeth on the sleeve upon relative axial movement of the balk-ring and the sleeve with arcuate spaces between some of said teeth on the balk-ring, abutments integral with the outer periphery of the clutch-sleeve axially disposed between the series of clutch-teeth on the sleeve and extending into said arcuate spaces for limited relative rotation when the teeth on the balk-ring are positioned axially between the series of clutch-teeth on the sleeve, conoidal friction-faces on the ends of the balk-ring and mating friction-faces on the wheels, for producing relative rotation of the balk-ring and clutch-sleeve to alternately move the teeth on the balk-ring into axial abutting relation with one series, and into axial aligned relation with the spaces between the teeth on the other series, of the clutch-teeth on the sleeve and controlling relative axial sliding movement of the sleeve for meshing the clutch-teeth on the sleeve on the wheels.

ERNEST T. GILLIARD.